U. ROBERTS.
NEGATIVE OUTLINE INDICATING DEVICE.
APPLICATION FILED JAN. 19, 1912.
1,073,169.
Patented Sept. 16, 1913.
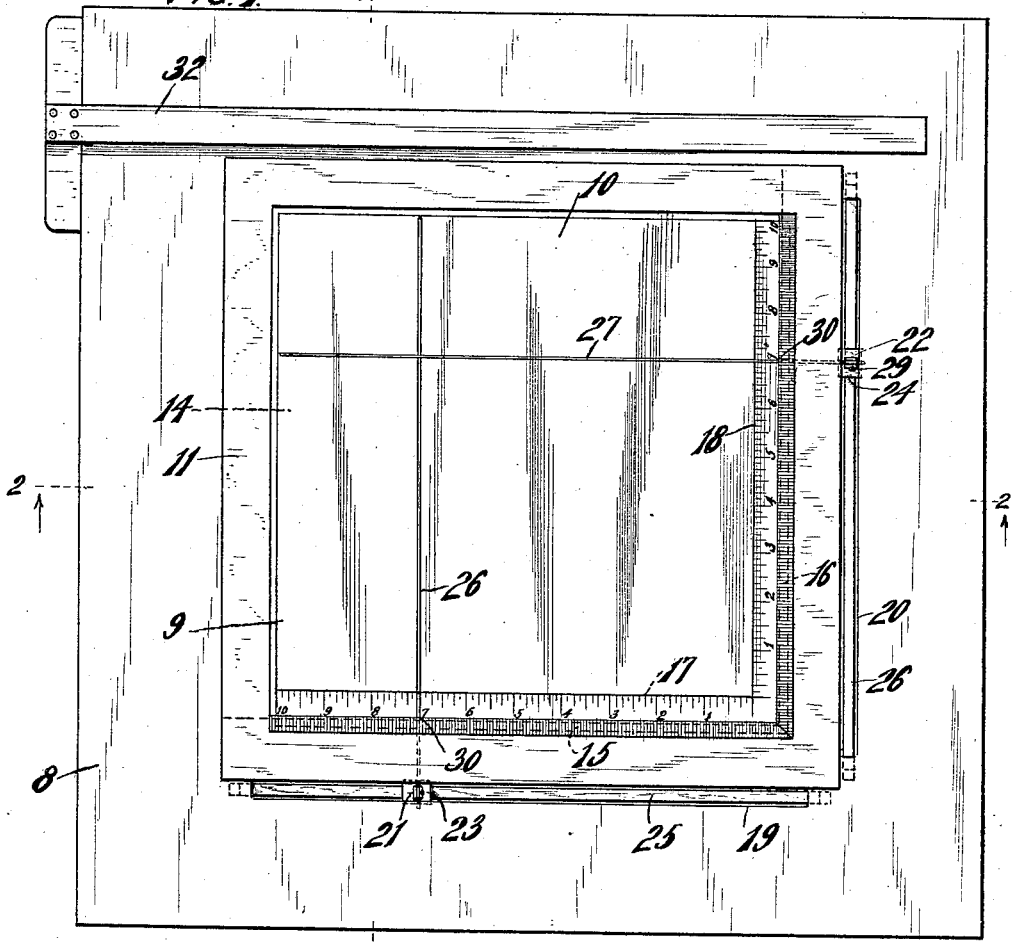
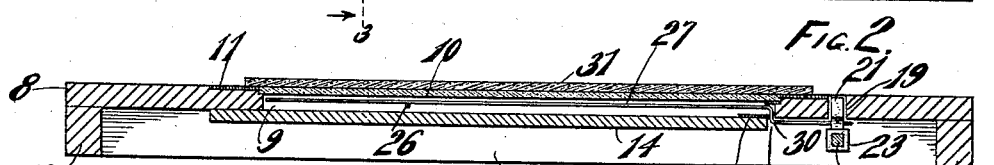
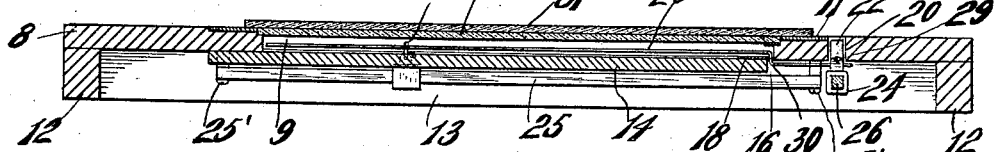
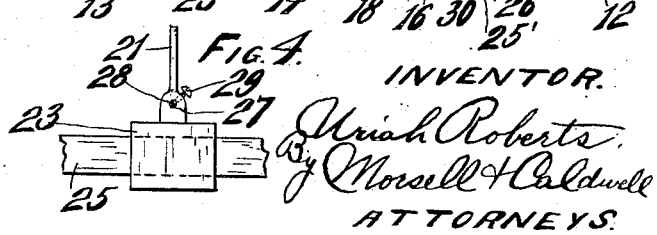
WITNESSES.
INVENTOR.
Uriah Roberts
By Morsell & Caldwell
ATTORNEYS.

UNITED STATES PATENT OFFICE.

URIAH ROBERTS, OF COLUMBUS, WISCONSIN.

NEGATIVE-OUTLINE-INDICATING DEVICE.

1,073,169.  Specification of Letters Patent.  Patented Sept. 16, 1913.

Application filed January 19, 1912. Serial No. 672,125.

*To all whom it may concern:*

Be it known that I, URIAH ROBERTS, a citizen of the United States, and resident of Columbus, in the county of Columbia and State of Wisconsin, have invented new and useful Improvements in Negative-Outline-Indicating Devices, of which the following is a description, reference being had to the accompanying drawings, which are a part of this specification.

This invention relates to improvements in negative outline indicating devices.

In the photo-engraving art it is the usual custom to outline on the negative used rectangular lines to indicate the dimensions of the photo-engraving to be made from the negative, and also to properly position the illustration medially within the lines marked on the negative. In outlining, the negative is usually placed on a rectangular board and a T-square is placed over the negative at approximately the place to properly position the illustration, and a rule is used to measure the length of the line desired and marks are then made to indicate the ends of the line. The line is then marked or cut on the negative along the edge of the T-square and the same measuring and indicating and marking is followed with reference to the other lines to complete the rectangular inclosing lines around the illustration. As only one line is indicated at a time it is ofttimes found that when the outlining is completed the illustration is not properly positioned within the rectangular outline and the work has to be done over again.

It is one of the objects of this invention to overcome the before mentioned objectionable features and to provide a negative outline indicating device which may be adjusted to indicate rectangular outlines of various dimensions and which will permit the illustration of the negative to be properly centered with relation to the outline before the outline is marked on the negative.

A further object of the invention is to provide a negative outline indicating device which is easily adjusted, is strong and durable, and which may be manufactured for a minimum amount.

With the above and other objects in view, the invention consists of the improved negative outline indicating device and its parts and combinations, as set forth in the claims, and all equivalents thereof.

In the accompanying drawing in which the same reference characters indicate the same parts in all of the views: Figure 1 is a top view of the improved negative outline indicating device; Fig. 2 is a sectional view thereof taken on line 2—2 of Fig. 1; Fig. 3 is a sectional view of the device taken on line 3—3 of Fig. 1; and Fig. 4 is a detail view of one of the slide members.

Referring to the drawing the numeral 8 indicates the frame or board which is of rectangular shape and has a rectangular opening 9 covered with a transparent glass 10. A border 11, of yielding material, surrounds the glass and both glass and the material are set into the board so that their upper surfaces will be approximately flush with the upper surface of the board. The lower side edge portions of the board are provided with depending reinforcing flange strips 12 to provide a space 13, beneath the board proper, to accommodate movable and other parts of the device. A bottom board 14 extends beneath the board opening 9 and covers said opening, with the exception of two side edges thereof, to form elongated slots 15 and 16 which extend at right angles with relation to each other. The edge portions of the bottom board adjoining the elongated slots are provided with dimension scales 17 and 18 divided to indicate the inches and fractions thereof.

The board is provided with elongated slots 19 and 20 extending in lines parallel to the slots formed in part by the edges of the bottom board, and upstanding fingers 21 and 22 extend into these slots 19 and 20 and are movable longitudinally therein. The fingers form part of the tubular slidable members 23 and 24 which are slidably mounted on the squared guide rods 25 and 26. These guide rods are positioned beneath the slots 19 and 20 and extend longitudinally with relation thereto and are fastened to the board at opposite ends by screws 25'. The portions of the fingers 21 and 22 immediately above the slidable members are enlarged to accommodate the ends of indicator rods 26 and 27 which extend through openings 28 provided therefor. Screws 29, threaded into the enlargements and impinging against the indicator rods, serve to fasten the said rods firmly to the slidable members. The indicator rods are bent at an angle as at 30 to pass through the elongated slots 15 and 16 and to clear the upper surface of the bottom board 14 and the lower surface of the glass 10 and each other. These rods extend approximately across the opening of the board and at right angles with relation to each other and are clearly discernible through the glass and the negative 31 resting on the glass. A T-square 32 is provided and is adapted to be used as a straight edge in marking the outline on the negative.

In use the slidable members are moved along the guide rods until the indicator rods are positioned above the scale at the desired points to indicate the size of the outline in inches or fractions thereof. The negative is now placed on top of the glass and moved to a medial position with relation to the lines indicated by the rods and the edges of the scale and visible through the negative, and when the illustration is properly positioned the rectangular outline is marked on the negative over the indicated lines, the T-square and a pencil or knife being used for that purpose.

From the foregoing description it will be seen that the negative outline indicating device is of very simple construction and is easily adjusted to indicate a rectangular outline of various dimensions and is well adapted for the purpose desired.

What I claim as my invention is:

1. A negative outline indicating device, comprising a frame formed in part of transparent material and adapted to have a negative placed thereabove, and a movable line indicating means discernible through the transparent material and the negative for indicating in connection with the inner corner edges of the frame a rectangular outline on the negative.

2. A negative outline indicating device, comprising a frame adapted to have a negative placed thereabove, and a pair of movable indicating members discernible through the frame and the negative, said members extending in lines at right angles with relation to each other.

3. A negative outline indicating device, comprising a frame adapted to have a negative placed thereabove, and a pair of movable indicating members discernible through the frame and the negative, said members extending in lines at right angles with relation to each other and forming in connection with the inner corner edges of the frame a rectangular outline.

4. A negative outline indicating device, comprising a frame adapted to have a negative placed thereabove, dimension scales forming part of the frame and extending in lines at right angles with relation to each other, and a pair of movable indicating members discernible through the negative and extending at right angles with relation to each other, said members in connection with the dimension scales forming an adjustable rectangular outline.

5. A negative outline indicating device, comprising a frame adapted to have a negative placed thereabove, dimension scales forming part of the frame and extending in lines at right angles with relation to each other, guide rods connected to the frame, and slidable members mounted on the rods and having indicating rods discernible through the negative and extending at right angles with relation to each other, said indicating rods in connection with the dimension scales forming an adjustable rectangular outline.

6. A negative outline indicating device, comprising a frame provided with a rectangular opening and with elongated slots extending parallel with two sides of said opening, a transparent material covering the opening, a pair of dimension scales positioned beneath the transparent material and extending in lines at right angles with relation to each other, guide rods positioned beneath the slotted portions of the frame and connected to the frame, members slidably mounted on the guide rods and provided with fingers which project upwardly into the slots, and indicator rods carried by the members and extending beneath the transparent material and in lines at right angles with relation to each other, said indicator rods and the dimension scales forming an adjustable rectangular outline discernible through a negative placed on the transparent material.

In testimony whereof, I affix my signature, in presence of two witnesses.

URIAH ROBERTS.

Witnesses:
 W. C. LEITSEF,
 MABEL F. HALL.